2,771,416
WATER PURIFICATION
Edmund J. Ryan, Miami, Fla.

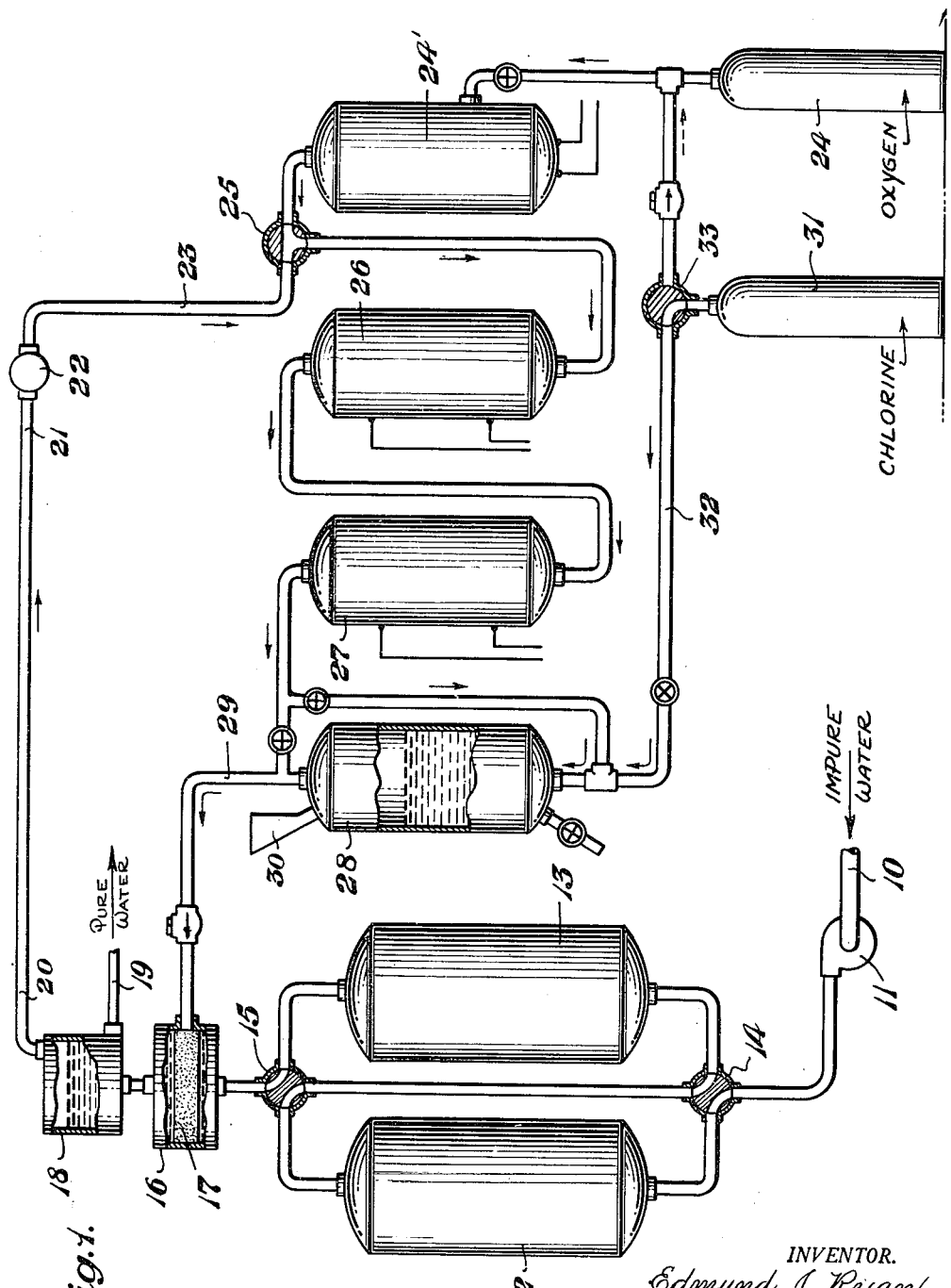

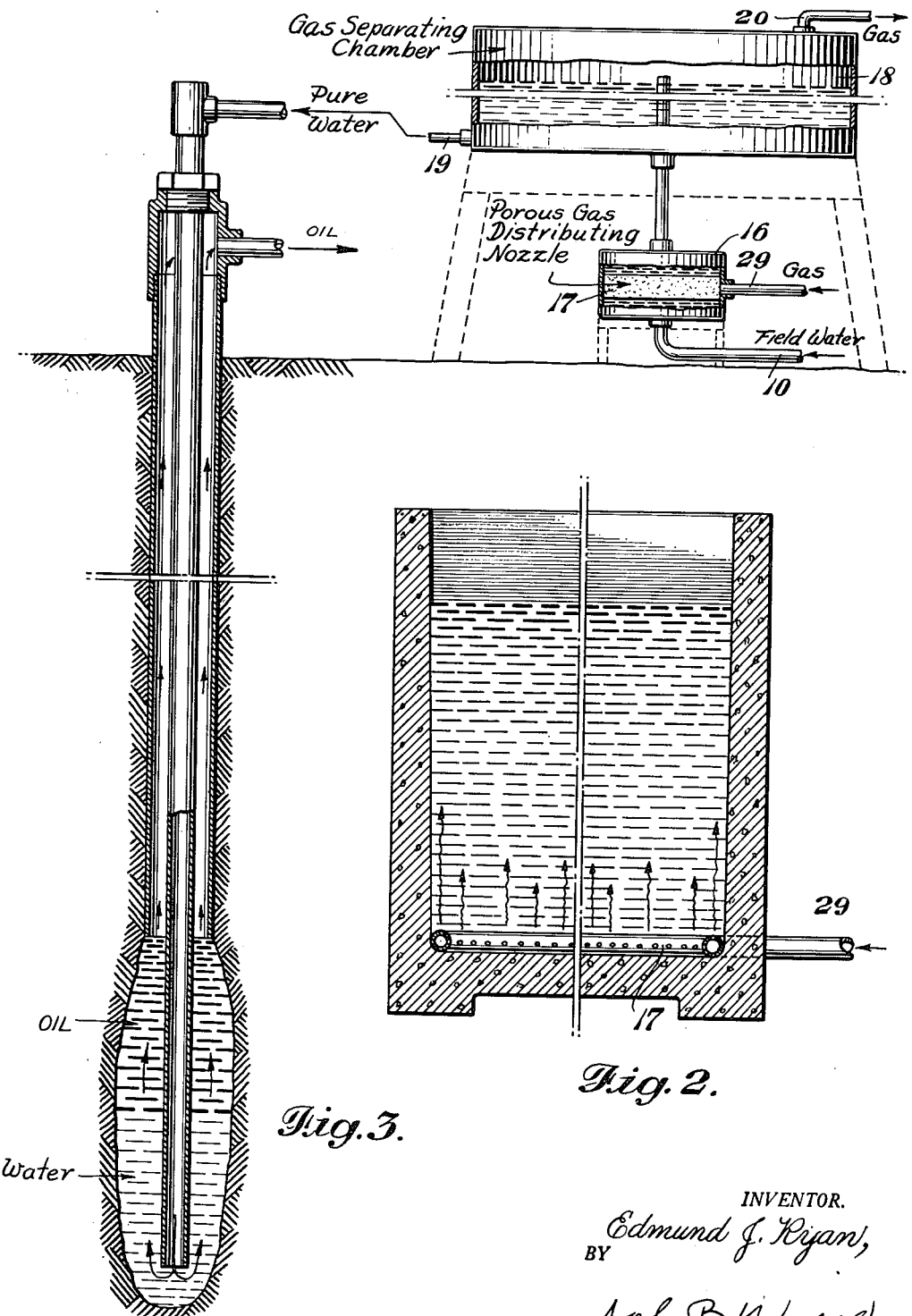

Application March 6, 1950, Serial No. 147,923

23 Claims. (Cl. 210—16)

This invention relates to purification of water with a gaseous activated oxidizing agent and further to the impregnation of water with substantial quantities of gaseous oxidizing agent wherein the water may serve as a carrier therefor for application of such gaseous oxidizing substance for various oxidizing purposes such as bleaching or purification of other materials by oxidation.

The gaseous oxidizing agent hereof is a new type and is described and claimed in my copending application Serial No. 142,831, filed February 7, 1950, now Patent No. 2,637,688, issued May 7, 1953, of which the present application is a continuation in part, that patent being a continuation-in-part of application Ser. No. 50,199 now abandoned.

According to one phase of the present invention, water in various stages of purity and containing various organic contaminants, is treated with an activated oxidizing gas to purify the same to rapidly completely or partially, destroy the organic matter. By the term purification, as used herein, it is intended to include destruction of bacteria and at least partial destruction of any oxidizable organic matter that may be present. The activated gas hereof, while destroying the bacteria apparently oxidizes some of the finely suspended or dissolved organic matter and thereby removes color, where such organic matter imparts a color to the water, as well as odor, where the organic matter and/or bacteria imparts an odor to the water, and leaves a bacteria-free clear colorless and odorless water.

Waters in various degrees of contamination may be purified according to the present method to convert the same to bacteria- and organic-material-free water generally of crystal clarity which is substantially tasteless and odorless in the concentrations of gas used. Thus, this water purification is usefully applied to contaminated large bodies of water such as rivers, bathing and beach water, drinking water, drinking water systems containing drinking water and water used for machinery cooling and plant processing, as well as sewage or waste waters containing suspended organic matters generally dispersed into running streams and tending to contaminate the same. Thus, waste waters of rivers, harbors, flowing streams, stagnant ponds, as well as waste water flowing through pipe lines for disposal or to be used in factory processing of various materials particularly organic may be treated for purification according to the present process.

Another important application in the purification of water is the purification of field waters from local wells and streams which of necessity, must be used either for making up fluid drilling muds at the site of a well drilling or in the use for waters for flushing oil where oil flushing methods are used in the extraction of oil from a well, or in merely cleaning the well. The problem of preventing bacterial contamination which results from rapid growth in the presence of oil and which generally results in the clogging of the sand interstices as well as the oil lines from the well by tarry, waxy and slimelike deposits of organic matter resulting from such bacterial action upon the oil, has been acute. According to the present method the available vicinity waters of any degree of purity may be treated to purify the same. Where relatively crude local waters are to be used in very large quantities the oxygen polymerized in the presence of halogen with or without further contact with halogen containing catalyst may be used.

Similarly it is a useful application of the present invention to decontaminate sea water, normally pumped through ship lines into fuel oil tanks for ballasting of tanks and displacement of the oil as it is used. The inhibition of bacteria growth in these waters results in clean systems, free of organic residue formed by bacterial decomposition of the oils.

The preferred water purifying gas used herein is an activated polymeric form of oxygen whose preparation is described in greater detail in my co-pending applications above referred to. Reviewing the process of forming the gaseous water purifying agent, warm substantially pure oxygen is first subjected under pressure to radiant energy such as ultra-violet light having a wave length of 2,000 to 4,800 angstrom units. Thereafter, the gas is treated by high voltage discharge of the order of at least 5,000 volts and preferably higher, such as 11,000 to 18,000 volts, but higher voltages as described therein may be used. During these treatments the oxygen gas is maintained under a substantial pressure of at least 10 pounds gauge; higher pressures generally tending to a greater degree of polymerization. Generally a pressure in the range of 10 to 50 pounds gauge will be used but higher pressures in the range of 100 to 10,000 atmospheres may be used for very large installations where rugged constructions of apparatus to withstand such pressures are economical. The oxygen gas is also preferably heated to a temperature generally exceeding 100° F., operation in the temperature range of 100° to 200° F. being generally satisfactory; however, higher temperatures up to 600° F. will operate.

The oxygen gas so treated is substantially entirely in polymerized form and may be used as such but preferably is generally thereafter modified by halogen containing catalyst, or according to a modification hereof, the oxygen may be modified in the presence of halogen with or without subsequent treatment with a halogen containing catalyst.

The halogen containing catalyst consists of a concentrated solution in water of halogen either as pure elemental halogen dissolved in water, or a water soluble inorganic halogen salt dissolved in water. The halogen may be either elemental halogen (chlorine, fluorine, bromine, or iodine) or soluble inorganic salts thereof, such as sodium, potassium, lithium, magnesium, barium, strontium or calcium, halides, halates, halites, hypohalites, or oxy-halides. Specific examples of an inorganic halogen salt or element are sodium chloride, sodium bromide, sodium fluoride, sodium iodide, free elemental iodine, free elemental chlorine, free elemental bromine, free elemental fluorine, sodium hypo-iodite, sodium hypofluorite, potassium trio-iodide, potassium hypo-chlorite, potassium bromate, sodium tri-iodide, potassium hypochlorite, potassium bromate, potassium acid fluoride, sodium periodate, sodium hypo-chlorite, sodium acid fluoride, lithium periodate, sodium hypo-chlorite, chlorine di-oxide, calcium iodide, barium chloride, strontium chlorate, magnesium chloride. Mixtures of such halogen materials in many instances are desirably used. The elemental halogen or salt thereof is generally used as a concentrated solution in water. In normal operation the aqueous solution is saturated with respect to the free halogen or salt thereof and, to maintain the saturation, an excess of salt or elemental halogen is usually present as a slurry or suspension in the water, but this is not necessary since any concentrated solution of halogen or salt thereof in water will operate and the concentration of halogen material may vary anywhere from 25% up to complete saturation based upon the quantity of the particular halogen material which will dissolve.

Other substantially inert salts may be used in the catalyst solution primarily to raise the gravity of the halogen containing liquid to give optimum washing contact with the oxygen polymer passed therethrough and also to give improved solubility effects of the halogen. Such inert salts as the soluble sulphates are suitable and the liquid in which the halogen is dissolved may be such as already have a natural halogen content as well as lesser quantities of other salts, for example, natural halogen-containing brines including ordinary sea water. It will be understood that sea water when used will generally be further fortified with the halogen to substantial saturation.

In forming the halogen activated polymeric oxygen gas, the pure oxygen, partially polymerized by subjection to radiant energy and high voltage discharge, is bubbled through the saturated aqueous halogen containing catalyst in the pressure and temperature range given above and at a rate variable with the size of the apparatus. For example, for forming small quantities a useful rate is about ½ to 10 liters of gas per liter of aqueous catalyst per minute.

The gas obtained is then used in the water purification herein described. Such gas may be used directly as produced or may be compressed and/or liquified, stored and re-evaporated for subsequent use. However, it is preferred to use the gas directly as obtained from the catalytic treatment.

The gas obtained prior to catalytic treatment is already substantially polymeric. I do not know the complete analysis of this gas. The polymerized gas probably contains a substantial quantity of ozone, but it is believed further to contain substantial quantities of higher polymers of oxygen. Thus the gas by the particular ozonizing physical treatments hereof starting with pure oxygen gas contains ozone, residual quantities of pure oxygen and substantial quantities of other forms of oxygen unanalyzable. After passing through the halogen catalyst the gas is highly activated and it appears probable that the halogen of the salt in the catalyst solution itself is oxidized to free halogen and some of which is vaporized and entrained by the polymerized oxygen gas. However, the activity of the gas appears to indicate that the polymer containing oxygen is further polymerized in the catalytic contact to increase the quantity of higher polymeric oxygen therein. It is also possible that the halogen itself vaporized into the polymerized oxygen gas stream is also oxidized and may be present in the form of a halogen oxide. Whatever the case is, I am not certain, and therefore do not intend to be limited by any theory as to the exact chemical reactions which do take place in the several reaction stages. It appears at present most probable that the gas in addition to polymeric oxygen with some content of higher polymers of oxygen as well as ozone, further contains some halogen which may be free or oxidized. I therefore use the term "halogen activated polymeric oxygen" to define the gas herein obtained by halogen treatment in the gaseous or liquid catalyst state.

The oxygen gas after ultra violet light treatment and high voltage discharge, prior to halogen treatment, is already polymerized but is much more highly activated by the subsequent catalysis upon passage through the halogen containing liquid. Applicant therefore prefers the method described herein for producing polymeric oxygen prior to passing the same through the halogen catalyst. However, it is possible to further activate ordinary ozone formed from oxygen by passing such ozone through the halogen catalyst, but such gas is not so highly polymerized and less active.

Thus, within the scope of the present invention, applicant first produces a polymeric oxygen gas preferably by subjecting the oxygen gas under heat and pressure first to ultra violet light and then to high voltage discharge to form a gas so highly polymerized as to be directly useful in water purification, but other sources of polymeric oxygen such as an ordinary ozone generator may be substituted as the source of the polymeric oxygen. The polymeric oxygen obtained by the preferred polymerizing procedure is preferably passed through the halogen containing catalyst and is then ready for introduction into water for purification thereof according to the present invention. Where ordinary ozone is used as a source of polymeric gas, the treatment with halogen is essential, but even halogen treatment of ozone does not give a gas of equivalent activity to that polymerized by the preferred method.

In a modification of the present invention it is also possible to introduce pure halogen preferably gaseous into the oxygen, prior to polymerization thereof so that the polymeric oxygen after subjecting to ultra violet light and high voltage discharge, contains from 1 to 25%, preferably 5 to 15% of halogen either as free halogen or halogen in an oxidized and possibly polymerized form or combination thereof. The polymeric oxygen gas containing halogen is preferably then passed through the halogen containing catalyst and then used in water purification. However, in this case where heavy rapid dosages of gas is to be applied to crude waters such as swamps or large areas to be decontaminated, the mixture of polymeric oxygen and halogen may be directly applied without further catalytic treatment.

In treatment of water for drinking purposes the water, if it contains inorganic and organic sediment, may be first conventionally filtered to remove such suspended matter but where commercial waters, waste water or large bodies of water are merely to be generally purified for purposes other than drinking, filtration is optional. The water is treated where it is a stagnant body such as in a tank, river, bay or pond, etc. by bubbling the gas through a substantial head of water, i. e. 1 to 15 foot head or more. Any quantity of the gas soluble in water may be applied. The gas to destroy the bacteria and oxidize organic matter must contact the water which is effected by aeration of the water with the gas for intimate contact thereof. Bacteria as shown by the examples below are substantially immediately destroyed upon contact with the gas. Hence, it is not essential for purposes of merely destroying bacteria that any substantial residual quantity of the gas remain dissolved in the water, and any application to give a homogeneous aeration throughout the water will suffice. Effective oxidation however, of substantial quantities of organic matter requires sufficient oxygen supply to react therewith. The adequacy of the activated gas supply for such purposes may be tested by analysis of the bacteria content of the water after treatment or the residual dissolved gas content. Any residual dissolved content of such gas indicating that effective aeration and oxidation has taken place, and an excess of gas has been applied. Larger excesses than a residual dissolved gas content of 30 p. p. m. would not generally be used, but such excess is not a critical factor, and larger quantities may be applied to any water, the quantity considerations being largely economic.

While all the halogens are useful in the purification of contaminated waters as described herein the halogens are not full equivalents in their effect on various types of contaminants, and will be selected generally on the basis of the type of contaminant contained in the water. Thus, all halogens will destroy bacteria within a short period of time as shown in the examples below. It is found that the heavy halogens, bromine and preferably iodine are particularly effective where a spore forming bacteria, such as tetanus and/or parasites and/or fungi are encountered in the water, and it is desired not only to kill the same but also destroy the spores thereof where they occur. For this purpose the halogen iodine is most effective and the rapidity of destruction of spores, parasites, or fungi decreases with the lighter halogen, bromine and its salts being the next most effective.

Where the water is to be used for drinking purposes and particularly with a view to having a desirable fluorine content, for its known effect to inhibit dental caries, the fluorine type of halogen would be preferred. Thus, it would be used for drinking water purposes where the water is not highly contaminated with bacteria and its bacteria is generally not of the spore forming type. However it is usual for these effects to use a mixture of the different halogens to effect the several results.

It will be understood however, that all of the halogens have a utility in destroying bacteria varying with the time and concentration of contact, and for purpose of general economy and availability chlorine is generally used for most commercial and industrial applications and would be used in any case except in the specific instances where high contamination with spore forming bacteria is encountered, in which case iodine would be preferred; or fluorine where it is desirable to impart a specific fluorine content for purposes of improving the water to inhibit dental caries in certain drinking waters, and generally mixtures thereof would be used.

In a preferred form of operation of the present invention the apparatus as described particularly in applicant's copending application wherein the oxygen gas is directly polymerized and halogen treated, is immediately bubbled into a pipe line carrying the water.

It will be understood that to impart a requisite quantity of oxygen a certain volume of gas may be diffused into a pipe line in proportion to the amount of water passing therethrough and at some subsequent stage, the excess gas, which is not dissolved, may be removed. In batch treatments the gas may be merely bubbled upwardly from the bottom of the tank or body of water having from 1 to 15 foot head or more over a period of time such as from 5 to 30 minutes or longer, sufficient to oxidize a desirable portion of the organic matter content therein and sometimes allow a residual content of dissolved gas.

The drawings herewith illustrate the apparatus for effecting the invention and for the application thereof.

Fig. 1 shows a diagrammatic flow sheet or plan of use of the gas generator hook-up to an ordinary pump line system carrying the water of any quantity for purification thereof.

Fig. 2 is a detailed view showing application of activated gas for aerating stagnant waters in a tank, pond, pool etc. or even flowing waters unconfined, in a stream.

Fig. 3 illustrates the application of activated gas to oil well operations for purification of waters and drilling fluids used therewith.

The apparatus set forth in the drawings herein shows diagrammatically a hook up for treatment of water being carried through a pipeline 10. The apparatus shows pump 11 which supplies water to any series of filters of conventional construction 12 and 13, hooked up through a pair of four-way valves 14 and 15, to allow operation of the filters either singly or in series whereby one of the filters may be cleaned while the other is in operation.

The water is then passed through a diffuser chamber 16 which contains a diffusing member 17 situated so that the water will either pass therethrough or in close proximity thereto. Such member 17 may be a series of perforated pipes, porous stone or porous metal through which either gas or water or both may pass. The water containing gas bubbles is then passed through a gas separating chamber 18 which is merely a container large enough to slow the passage of water and alow the gas to separate as bubbles, the water being withdrawn through a pipe 19 and the separated gas overhead through a pipe 20. The evolved spent gas may be either wasted or recycled through a line 21 to the inlet of the gas activating apparatus for reactivation and re-use.

As indicated, details of the apparatus for activating the gas are set forth in applicant's copending applications, the present drawing showing the same only in diagrammatic form of which a supply of gas 23 as recycled gas obtained with the aid of pump 22 from lines 21 as withdrawn from the gas separating chamber 18, is used, or an extraneous source of pure oxygen from a compressed oxygen tank 24 is used alternately through any three-way valve 25. The gas at a pressure of approximately 10 to 50 lbs. per square inch gauge, for example 40 lbs. per square inch gauge is passed into chamber 24' which contains heating elements and thence to a chamber 26 which contains a source of ultra-violet light to raise the temperature of the gas to the range of 100° to 200° F., for example, 150° F. and irradiate the same. The gas, after treatment by ultra-violet light in chamber 26 and under the pressure and the raised temperature is then passed into a chamber 27 wherein it is subjected to a high voltage discharge preferably in the range of 11,000 to 18,000 volts such as about 15,000 volts whereby the oxygen is converted to a polymeric form. The gas is then bubbled through the catalyst tank 28 containing an aqueous solution, preferably saturated, of halogen or halogen salt as described above, for example, a saturated solution of sodium chloride. The evolved gas then passes through line 29 into a diffuser plate or perforated pipe 17 for distribution to the water being treated. From time to time additional halogen salt may be added as a slurry from a hopper 30 to the catalyst tank 28 or pure halogen gas such as chlorine or fluorine may be supplied from a compressed halogen tank 31 which leads directly to the catalyst tank through line 32 or by way of a three-way valve 33 is mixed with the warm oxygen prior to polymerization. As a modification of this invention, as pointed out above the halogen may be mixed with the oxygen in tank 24 in proportions of about 1 to 25%, for example, 10% and thence passed through the polymerizing system therewith. Accordingly, in the system thus shown, the water is treated in a pipe-line by bubbling halogen activated polymerized oxygen gas therethrough and then undissolved gas from the separating chamber 18 is recycled to the system. Such is a highly economical method of treating the water wherein a substantial bulk of the gas is reclaimed for re-use.

The generator, of course, may be applied as a hook-up in a system wherein the filters are omitted, particularly on water storage lines, wherein the water generally has already been filtered. Also the water purification gas generator may be applied to water systems where the water is not to be used for drinking purposes, merely to destroy contaminating organic matter. It is also possible to treat large bodies of water by merely using a series of perforated pipes suspended in the water such as in ponds, swimming pools, rivers, harbors and bays as well as storage tanks for drinking or waste waters. In some instances it will be understood it may be desirable merely to decontaminate sewage waters by killing the bacteria therein without oxidation of all of the suspended organic matter content. In such cases the supply of the activated gas will be limited to obtain the result desired, that is for example destruction of the bacteria content without substantial removal of the organic matter.

Thus, as shown in Fig. 2 the supply of activated gas may be applied through any porous member 17 shown in this figure as a perforated pipe lying at the bottom of a large body of water through which activated gas bubbles are emitted. Such body of water may be as described, in a tank or large, relatively stagnant body of water, but may also comprise a large body of moving water unconfined, such as a river or stream.

Fig. 3 shows the application of the gas to a line 10 leading to an oil well of conventional construction wherein the line 10 would carry either contaminated water, generally available in the vicinity of the well or drilling muds made up therefrom. It is desirable to use a setup as shown in Fig. 1 having a gas separating chamber 18, similarly situated upon the water line to separate the gases which are not actually dissolved and prevent introduction of excessive quantities of gas into the well.

The following examples illustrate the practice of this invention:

*Example I.*—A 500 cc. sample of water was taken from the bay at Miami, Florida at a temperature of 65° F. and treated with gas produced by a generator as described above wherein a catalyst was used consisting of sea water containing an additional content of sodium chloride sufficient to saturate the sea water therewith and to allow some of the sodium chloride to settle as a slurry at the bottom of the catalyst tank to maintain the same continuously saturated. The activated gas was formed by passing oxygen gas from a supply tank of pure compressed oxygen at a rate 1½ liters per minute. The gas was first heated to a temperature of 150° F. and the generator was maintained at a pressure of 40 lbs. gauge. It was first passed through a tank containing ultra violet lamps radiating light at a wave length of 2486 angstrom units and thence through a second tank containing high voltage electrodes maintained at a volt discharge of 15,000 volts produced by a transformer operated at an input voltage of 110 volts and thence through the sea water catalyst saturated with sodium chloride and finally at the same rate of 1½ liters per minute through the 500 cc. sample of Miami bay water. The following table shows the results of the tests:

| Time, Minutes | Bacteria Count | | Color | | Odor | |
| --- | --- | --- | --- | --- | --- | --- |
| | Before | After | Before | After | Before | After |
| 0 | 150 | | Light yellow. | | None | |
| 5 | | 3 | | | | |
| 10 | | 3 | | | | |
| 15 | | 1 | | | | |
| 20 | | 1 | | | | |
| 25 | | 1 | | | | |
| 30 | | 1 | | Crystal Clear. | | None. |

It will be seen that the bacteria count was reduced in a period of about 5 minutes to a negligible value. The water with a slight yellow tinge was converted to crystal clarity and no odor was imparted.

*Example II.*—Highly contaminated river water from Miami River having a bacterial count of 10,000 per cc. was similarly treated in a 500 cc. sample with the same gas as in Example I and at the same rate of 1½ liters per minute. In 10 minutes of treatment the bacterial count was reduced to a negligible amount and the water changed from a yellowish tinge to crystal clarity:

| Time, Minutes | Bacteria Count | | Color | | Odor | |
| --- | --- | --- | --- | --- | --- | --- |
| | Before | After | Before | After | Before | After |
| 0 | 10,000 | | Yellow | | None | |
| 5 | | 1,000 | | | | |
| 10 | | 80 | | | | |
| 15 | | 20 | | | | |
| 20 | | 7 | | | | |
| 25 | | 1 | | | | |
| 30 | | 1 | | Crystal Clear. | | None. |

*Example III.*—In another sample taken from the same river closely adjacent to a sewage waste outlet passing into the river, the bacterial count was 27,000 per cc. and in 10 minutes with a gas flow of 1½ liters per minute was reduced to a negligible value, and in 1 minute the sample became colorless.

| Time | Bacteria Count | Color | Odor | Solids |
| --- | --- | --- | --- | --- |
| 0 | 27,000 | Yellow (Colorless in 1 min.). | None | Present. |
| 5 | 110 | Colorless | | |
| 10 | 60 | | | |
| 15 | 11 | | | |
| 20 | 6 | | | |
| 25 | 3 | | | |
| 30 | 3 | | None | Reduced. |

*Example IV.*—A swamp containing highly contaminated stagnant water and overgrown during the warm weather with growing algae which coated the same as a scum, and having an area of about ½ an acre and a depth of water of about 2 feet, was treated with a gas formed by passing oxygen under heat and pressure as described in Example I, the catalyst being a saturated solution in water of sodium hypo chlorite, the gas being generated at a rate of about 10 liters per minute and passed through an open pipe having a distributing nozzle of porous stone which extended over the side of a barge upon which the gas generating apparatus, as described in the drawing herewith, was mounted. The pipe extended approximately 1½ feet below the bottom of the barge, the barge being moved slowly up and back over the surface of the pond for 8 hours while generating the gas which bubbled through the water and was continuously dissipated in the air. It was found that after this treatment no algae grew on the surface of the swamp, the water being substantially clarified for the entire season of approximately 6 months. Moreover, the swamp contained no mosquito larvae or exhibited other evidence of bacterial or insect larval contamination and the water was substantially odorless over the period of the test.

As an alternate procedure this example was repeated applying a simultaneously polymerized mixture of oxygen containing 15% of chlorine gas by volume, by exposing the gas mixture at a temperature of 185° F. and pressure of 50 lbs. gauge to ultra violet light of wave length of 2500 angstrom units and then exposing to a discharge of 18,000 volts and directly using the same without further catalysis. After 8 hours of treatment the swamp was similarly purified.

*Example V.*—A test was performed upon condenser cooling water on a ship wherein sea water was passed at a rate of 600 gallons per minute for purposes of condensing steam from a steam power plant operating the ship. Prior to this treatment the cooling water lines were contaminated with organic matter, such as algae and organic scums which coated the surfaces of the piping and condenser tubes. The gas generator was mounted as described in the drawing hereinabove to generate and pass halogen activated gas into the system, at a rate of 10 liters of gas per minute the gas being removed and bled off from time to time through a vent in the top of the condenser. It was found that within 6 hours after operation the lines were substantially clean including the condenser shell and condenser tubing, large quantities of inorganic scale was loosened from the walls and removed from the condenser hot well.

*Example VI.*—To show the effect of activated gas upon certain and definite bacteria cultures, several cultures of pure bacteria were formed in suspensions of each culture in 500 cc. of water. Samples were treated by bubbling activated gas at a rate of 1½ liters per minute through each sample. In each case a 500 cc. sample was used for control purposes which was not treated with the gas. The gas itself was formed similar to the previous examples using sodium hypochlorite in saturated solution in sea water as the catalyst. It will be understood that the samples were made up by innoculating each 500 cc. sample with the pure strain of bacteria, allowing usual incubation time and then treating. And in the case of the control no treatment with the activated gas was applied. The following table shows the results on several bacterium:

| Bacteria | Treated Group | Control Group |
| --- | --- | --- |
| H. influenzae saline suspension | No growth | Growth in 48 hours. |
| D. pneumoniae saline suspension | do | Do. |
| E. coli saline suspension | do | Growth in 24 hours. |
| B. abortus saline suspension | do | Do. |
| B. abortus broth culture | No growth in 24 hrs.; some growth in 72 hours under CO₂ tension. | Do. |
| B. subtilis saline suspension | No growth | Do. |
| M. tuberculosis saline suspension | No growth in 8 wks. observation. | Growth in 2-3 wks. |
| E. typhosus saline suspension | No growth | Growth in 24 hours. |
| Cl. tetani saline suspension | Growth in 24 hrs. | Do. |
| Cl. tetani broth culture | do | Do. |
| M. albicans saline suspension | No growth | Do. |

The treated organisms received five to eight minute exposure to the gas by bubbling it through the suspension. It is noted that in certain instances the bacteria generally of the spore forming type for example *Cl. tetani* showed immediate growth in 24 hours, similar to the control sample.

*Example VII.*—To illustrate the superior effect of iodine for treatment of the spore forming type of bacterium *Cl. tetani* as shown in the previous example, was treated both in saline and broth culture in the same manner as in Example VI with the difference that potassium triiodide was used as the catalyst and in this instance no growth was obtained of the bacterium in 24 hours either in saline suspension or broth culture whereas the control of course, showed the same results as in the previous example.

*Example VIII.*—The controls of Example VI after growth as indicated in Example VI, was treated by exposing the control in a subsequent test for a period of 5 to 8 minutes, the same gas flowing at 1½ liters per minute through each sample in each case, with the exception of *Cl. tetani*, was destroyed by the brief treatment with gas. The *Cl. tetani* was treated as described in Example VII with an iodine halogenated gas as described in Example VII and the control likewise showed no evidence of bacteria.

*Example IX.*—Polymerized oxygen gas containing at least 60% of polymeric oxygen directly as obtained by ultra violet light exposure and high voltage treatment at high pressure and temperatures, as described hereinabove, is passed by bubbling through a liter of water for a period of forty minutes. The solution is then placed in gas tight container and subsequently applied as a laundry bleach. It was found to rapidly whiten cotton goods placed in the solution.

*Example X.*—A bleach solution was made up as in Example IX with the modification that the gas prior to aeration of the water was first passed through a catalyst solution comprising a concentrated solution of calcium hypo-chlorite in sea water. This gas after aeration of water to saturation as described in Example IX was found to be an extremely active bleach solution for raw washed cotton dipped therein.

*Example XI.*—The gas of Example X was injected into water under pressure of 50 lbs. per square inch and sealed in a container under this pressure and was found to be a highly active bleaching solution similar to Examples IX and X.

*Example XII.*—The solution of Example XI was applied as an agricultural spray to a tree under attack by fungus. It was found that the solution after drying had killed the fungus.

*Example XIII.*—The solution of Example IX was used for washing raw citrus fruit prior to packaging. It was found that the fruit was resistant to destruction by mold as compared to unwashed fruit.

*Example XIV.*—A suspension of adequately beaten paper pulp is bleached by passing halogen activated gas through the pulp for one hour while agitating the pulp to obtain homogeneous oxidation thereof.

According to another modification of the present invention the highly polymerized oxygen gas directly as obtained or with a further halogen content obtained by adding halogen to the oxygen prior to polymerizing or by passing polymerized gas through the catalyst solution, is dissolved in the water to a point of saturation to impart thereto a maximum quantity of the gas. For this purpose gas is bubbled through a column of water until the water absorbs as much as will dissolve, a quantity generally exceeding 1 cc. of gas per liter of water; and preferably the gas is passed through the water under pressure or may be injected under pressure into a container partially filled with water similar to typical carbonation of water. The excessive quantity of polymerized oxygen in the water acts as an oxidizing agent where the fluid is applied for oxidizing purposes, such as, as a bleach solution for laundry, paper pulp, etc. or as an agricultural spray for the destruction of fungus, bacteria or insects, in view of the extremely active biocidal properties of the gas. Of course the bleaching may also be effected by first suspending the material to be bleached such as cloth, laundry, paper pulp, etc., in the water and then passing the gas therethrough, or both oxidizing gas and material to be bleached or oxidized, disinfected, etc., may be simultaneously added to the water with the gas at rates adjusted to the degree of contact required.

Various other modifications of the present invention will occur to those skilled in the art. For example the activated gas hereof may be applied to waters to be used in ice making or waters which contain other salts such as brines used in deep freezing. Similarly, other methods of contacting the water with the activated gas to effect purification thereof may be applied, for example, the gas and the water may be simultaneously sprayed to effect contact. The water may be used in various places where a highly purified water is desired. For example waters that would normally be distilled for use in medications or as carrier therefor, may be treated by the present method. Similarly, where waters are to be carbonated in soft drinks such water may be treated with the present gas prior to carbonation or the gas may be mixed with the carbon dioxide and the water carbonated and purified simultaneously. Similarly, the gas generating apparatus may be mounted as part of a water treating assembly such as with a typical drinking fountain, particularly where the water is to be refrigerated.

It is accordingly intended that the disclosure and description hereof be regarded as exemplary and not limiting except as defined in the claims appended hereto.

I claim:

1. The method of purifying water comprising passing into the water a gas comprising a halogen activated polymeric oxygen, said polymeric oxygen consisting essentially of gas which has been polymerized by treating the same under conditions to convert a substantial proportion of the oxygen to ozone and higher polymerized forms of oxygen, and being halogen activated by contact of the polymeric oxygen gas with elemental halogen and salts thereof.

2. The method of purifying water comprising passing into the water a gas comprising polymeric oxygen which has been activated by incorporating therein a minor content of halogen, said polymeric oxygen consisting essentially of oxygen gas which has been polymerized by treating the same under conditions to convert a substantial proportion of the oxygen to ozone and higher polymerized forms of oxygen.

3. The method of purifying water comprising passing into the water a gas comprising polymeric oxygen which has been activated by passing the same through a catalyst comprising a concentrated aqueous solution of halogen material selected from the group consisting of elemental halogen and water-soluble salts thereof, said polymeric oxygen consisting essentially of oxygen gas which has been polymerized by treating the same under conditions to convert a substantial proportion of the oxygen to ozone and higher polymerized forms of oxygen.

4. The method of purifying water comprising passing into the water oxygen gas which has been polymerized and further activated by passing the same through sea water which has been saturated with a halogen material selected from the group consisting of elemental halogen and water-soluble salts thereof said polymeric oxygen consisting essentially of oxygen gas which has been polymerized by treating the same under conditions to convert a substantial proportion of the oxygen to ozone and higher polymerized forms of oxygen.

5. The method of destroying organic matter and bacteria in contaminated water comprising passing into the water a gaseous oxidizing agent comprising halogen activated polymeric oxygen for a period of time sufficient to at least partially oxidize the organic matter therein, said polymeric oxygen consisting essentially of gas which has been polymerized by treating the same under conditions to convert a substantial proportion of the oxygen to ozone and higher polymerized forms of oxygen, and being halogen activated by contact of the polymeric oxygen gas with elemental halogen and salts thereof.

6. The method of decontaminating drinking water comprising passing into the water a halogen activated polymeric oxygen gas for a period of time sufficient to destroy bacteria, said polymeric oxygen consisting essentially of gas which has been polymerized by treating the same under conditions to convert a substantial proportion of the oxygen to ozone and higher polymerized forms of oxygen, and being halogen activated by contact of the polymeric oxygen gas with elemental halogen and salts thereof.

7. The method of decontaminating waste water comprising bubbling through the water a halogen activated polymeric oxygen gas, said polymeric oxygen consisting essentially of gas which has been polymerized by treating the same under conditions to convert a substantial proportion of the oxygen to ozone and higher polymerized forms of oxygen, and being halogen activated by contact of the polymeric oxygen gas with elemental halogen and salts thereof.

8. The method of decontaminating water storage and piping systems containing water comprising applying to the water contained therein a gaseous oxidizing agent comprising a halogen activated polymeric oxygen gas, said polymeric oxygen consisting essentially of gas which has been polymerized by treating the same under conditions to convert a substantial proportion of the oxygen to ozone and higher polymerized forms of oxygen, and being halogen activated by contact of the polymeric oxygen gas with elemental halogen and salts thereof.

9. A method of purifying water comprising first filtering the water to remove suspended insoluble contaminants and then passing therein a halogen activated polymeric oxygen gas in quantities sufficient to destroy the bacteria and oxidize at least a part of the organic matter, said polymeric oxygen consisting essentially of gas which has been polymerized by treating the same under conditions to convert a substantial proportion of the oxygen to ozone and higher polymerized forms of oxygen, and being halogen activated by contact of the polymeric oxygen gas with elemental halogen and salts thereof.

10. In the treatment of sewage sludge highly contaminated with bacteria the step of passing into said liquid suspension of sewage a halogen activated polymeric oxygen gas, said polymeric oxygen consisting essentially of gas which has been polymerized by treating the same under conditions to convert a substantial proportion of the oxygen to ozone and higher polymerized forms of oxygen, and being halogen activated by contact of the polymeric oxygen gas with elemental halogen and salts thereof.

11. In the flushing of oil wells with water for removal of oil therefrom the step of destroying the bacteria in the water by passing into said water a halogen activated polymeric oxygen gas, said polymeric oxygen consisting essentially of gas which has been polymerized by treating the same under conditions to convert a substantial proportion of the oxygen to ozone and higher polymerized forms of oxygen, and being halogen activated by contact of the polymeric oxygen gas with elemental halogen and salts thereof.

12. The method of decontaminating water comprising passing into the water a gas formed by polymerizing a mixture of halogen and oxygen, said polymeric oxygen consisting essentially of gas which has been polymerized by treating the same under conditions to convert a substantial proportion of the oxygen to ozone and higher polymerized forms of oxygen, and being halogen activated by contact of the polymeric oxygen gas with elemental halogen and salts thereof.

13. The method of decontaminating water comprising passing into the water a gas formed by passing polymerized oxygen and halogen simultaneously through an aqueous salt solution, said polymeric oxygen consisting essentially of oxygen gas which has been polymerized by treating the same under conditions to convert a substantial proportion of the oxygen to ozone and higher polymerized forms of oxygen.

14. The method as defined in claim 1 wherein the halogen is fluorine.

15. The method as defined in claim 1 wherein the halogen is bromine.

16. The method as defined in claim 1 wherein the halogen is chlorine.

17. The method as defined in claim 1 wherein the halogen is iodine.

18. The method as defined in claim 1 wherein the halogen is a mixture of halogens.

19. The method of purifying water comprising irradiating oxygen gas with ultra violet light and then subjecting the irradiated oxygen to a high voltage discharge exceeding 5,000 volts while maintaining the gas at raised temperatures and pressures and then passing said gas through the water to be purified.

20. The method of purifying an aqueous liquid contaminated with micro-organisms comprising passing into said liquid a gas containing oxygen, ozone, and halogen.

21. In the decolorization of water and organic materials suspended therein, the step of passing into said water a halogen activated polymeric oxygen gas sufficient to reduce the color thereof, said polymeric oxygen consisting essentially of gas which has been polymerized by treating the same under conditions to convert a substantial proportion of the oxygen to ozone and higher polymerized forms of oxygen, and being halogen activated by contact of the polymeric oxygen gas with elemental halogen and salts thereof.

22. In the washing of fresh fruits and vegetables for storage and transit, the step of treating the water to destroy bacteria therein by passing into the water a halogen activated polymeric oxygen, said polymeric oxygen consisting essentially of gas which has been polymerized by treating the same under conditions to convert a substantial proportion of the oxygen to ozone and higher polymerized forms of oxygen, and being halogen activated by contact of the polymeric oxygen gas with elemental halogen and salts thereof.

23. The method of purifying water, comprising passing oxygen gas containing ozone in substantial concentration therein through a concentrated aqueous solution of a halogen material and then passing into the water to be purified the gas thus formed.

References Cited in the file of this patent

UNITED STATES PATENTS

| | | |
|---|---|---|
| 383,184 | Leeds | May 22, 1888 |
| 450,404 | Dittrich | Apr. 14, 1891 |
| 829,875 | Lovejoy | Aug. 28, 1906 |
| 892,486 | Woolf | July 7, 1908 |
| 1,006,992 | Weiner | Oct. 24, 1911 |
| 1,197,640 | Kriegsheim | Sept. 12, 1916 |
| 1,426,046 | MacGregor et al. | June 20, 1922 |
| 1,907,691 | Wait | May 9, 1933 |
| 1,986,672 | Bergman | Jan. 1, 1935 |
| 1,987,059 | Goerner | Jan. 8, 1935 |
| 2,055,475 | Behrman | Sept. 29, 1936 |
| 2,221,339 | Allison | Nov. 12, 1940 |
| 2,231,423 | Horsley et al. | Feb. 11, 1941 |
| 2,443,429 | Marks et al. | June 15, 1948 |
| 2,452,970 | Vincent et al. | Nov. 2, 1948 |
| 2,580,809 | Marks et al. | Jan. 1, 1952 |
| 2,637,688 | Ryan | May 5, 1953 |

OTHER REFERENCES

Vosmaer: "Ozone" 1916, D. Van Nostrand Co., N. Y. pages 3, 12, 13, 25, 26, 72 and 30 relied upon.